Patented Mar. 3, 1925.

1,528,255

UNITED STATES PATENT OFFICE.

RALPH H. McKEE, OF NEW YORK, N. Y.

HYDROLYSIS OF SULPHURYL CHLORIDE.

No Drawing.   Application filed April 30, 1924.   Serial No. 710,157.

*To all whom it may concern:*

Be it known that I, RALPH H. McKEE, a citizen of the United States, residing at New York, in the county of New York and State of New York, have invented certain new and useful Improvements in Hydrolysis of Sulphuryl Chloride, of which the following is a specification.

This invention relates to hydrolysis of sulphuryl chloride to produce sulfuric acid and hydrochloric acid.

It has heretofore been proposed to produce sulfuric acid of from 65 to 80 per cent strength and gaseous hydrogen chloride by bringing together chlorine, sulfur dioxid, and steam or water or dilute hydrochloric acid in a reaction tower. This process is open to several objections, one of which is the necessity of carefully regulating the proportions of chlorine and sulfur dioxid. The use of a small excess of either substance permits a large amount of the inert mixed gas to escape from the tower and thereby causes a decided loss in yield and creates a nuisance in the community in which the process is being carried out.

It is also impractical to ship chlorine gas and sulfurdioxid gas to a plant for the purpose of practicing this process and it is, therefore, necessary to make these gases at the point where they are to be used.

The shipment of large amounts of hydrochloric acid is also very expensive due to the large amount of water which has to be transported therewith and the cost of the containers in which the acid is shipped.

By combining sulfur dioxid and chlorine to produce sulphuryl chloride in the manner described and claimed in my prior application filed June 26, 1923, Serial No. 647,899; and then shipping the sulphuryl chloride to the point where the sulfuric acid and the hydrochloric acid are to be manufactured, these disadvantages may be overcome, as sulphuryl chloride may be easily shipped in tank cars or metal drums.

The hydrolysis of sulphuryl chloride by the use of an excess of water has been proposed, but the concentration of the sulfuric acid obtained in this manner is small and the hydrochlorid acid formed is mixed with sulfuric acid.

In the present invention, I hydrolyze sulphuryl chloride by means of steam and with inexpensive equipment. While dry steam and sulphuryl chloride will not react to form sulfuric acid and hydrogen chloride, I have found that the use of a catalyst and particularly the use of a small amount of water causes a reaction to take place rapidly. Any acid-proof tower of the general type of that used for the Glover tower of a sulfuric acid plant may be employed and it is filled with the usual tower filling. The sulphuryl chloride and steam are introduced in the bottom of the tower in the proportions wished, e. g., one volume of sulphuryl chloride vapor to four volumes of steam. The steam may be slightly superheated to a temperature between 250 and 300° F. When the steam is first introduced into a tower at ordinary temperature, some of the moisture will be condensed on the walls of the tower or the filling and start the reaction. Dilute sulfuric acid will be formed in the upper part of the tower and flow downwardly, being concentrated by the reaction of the sulphuryl chloride on the water contained in the dilute acid. The hot sulfuric acid of about 80 per cent strength will flow from the bottom of the tower, and after cooling may be shipped in the ordinary way.

In a typical embodiment of the invention, a tower of the usual acid proof construction and of any desired height, for instance, 25 feet, may be employed. This tower is filled with any of the usual tower filling and sulphuryl chloride and steam, which may be superheated, is introduced into the bottom of the tower. Some of the steam first introduced will condense in the tower, giving the desired water to form a catalyst in the hydrolysis of the sulphuryl chloride. The sulfuric acid will be formed throughout the tower and will be dilute, due to the presence of an excess quantity of water. This acid will flow downwardly through the upwardly passing vapors and the sulphuryl chloride will react on the water contained in the dilute acid forming additional sulfuric acid. The sudfuric acid flowing from the bottom of the tower is of approximately 80 per cent strength and may be cooled and shipped in the ordinary manner.

The hydrogen chloride gas passes from the top of the tower together with some steam. The process should be so regulated that no sulphuryl chloride or only traces of sulphuryl chloride will escape from the top of the tower. The vapors may be condensed to produce muriatic acid of a purity comparing with the commercial muriatic acid on the market at the present time. The impurity is largely sulfuric acid which may be removed by passing the vapors through an electrical precipitator of the Cottrell type. This gives a resulting product even purer than the commercial muriatic acid commonly sold.

By placing a source of heat, such as an oil burner, near the base of the tower and heating the lower portion by passing into the tower, the hot burner gases thereof, a more concentrated sulfuric acid may be obtained. When the sulfuric acid is concentrated by heating in the tower, a product of more than 90 per cent strength is obtained.

While I have described in detail the preferred practice of my process, it is to be understood that the details of procedure, and proportion of ingredients may be widely varied, and that known chemical equivalents may be employed in place of the materials mentioned, without departing from the spirit of the invention or the scope of the subjoined claims.

I claim:

1. The process of hydrolyzing sulphuryl chloride which comprises treating sulphuryl chloride vapor with steam in the presence of a catalyst.

2. The process of hydrolyzing sulphuryl chloride which comprises treating sulphuryl chloride vapor with steam in the presence of water.

3. The process of hydrolyzing sulphuryl chloride which comprises passing sulphuryl chloride vapor and steam upwardly through an acid tower.

4. The process of hydrolyzing sulphuryl chloride which comprises contacting sulphuryl chloride vapor and steam, and permitting some of the steam to condense whereby the water formed will serve as a catalyst to cause the sulphuryl chloride and steam to react with each other.

5. The process of hydrolyzing sulphuryl chloride which comprises passing sulphuryl chloride gas and dry steam upwardly through a tower, delivering heated gases to the tower, and concentrating the sulfuric acid formed.

In testimony whereof, I affix my signature in presence of two witnesses.

RALPH H. McKEE.

Witnesses:
DONALD E. CABLE,
MARGARET J. STONE.